Patented Dec. 19, 1944

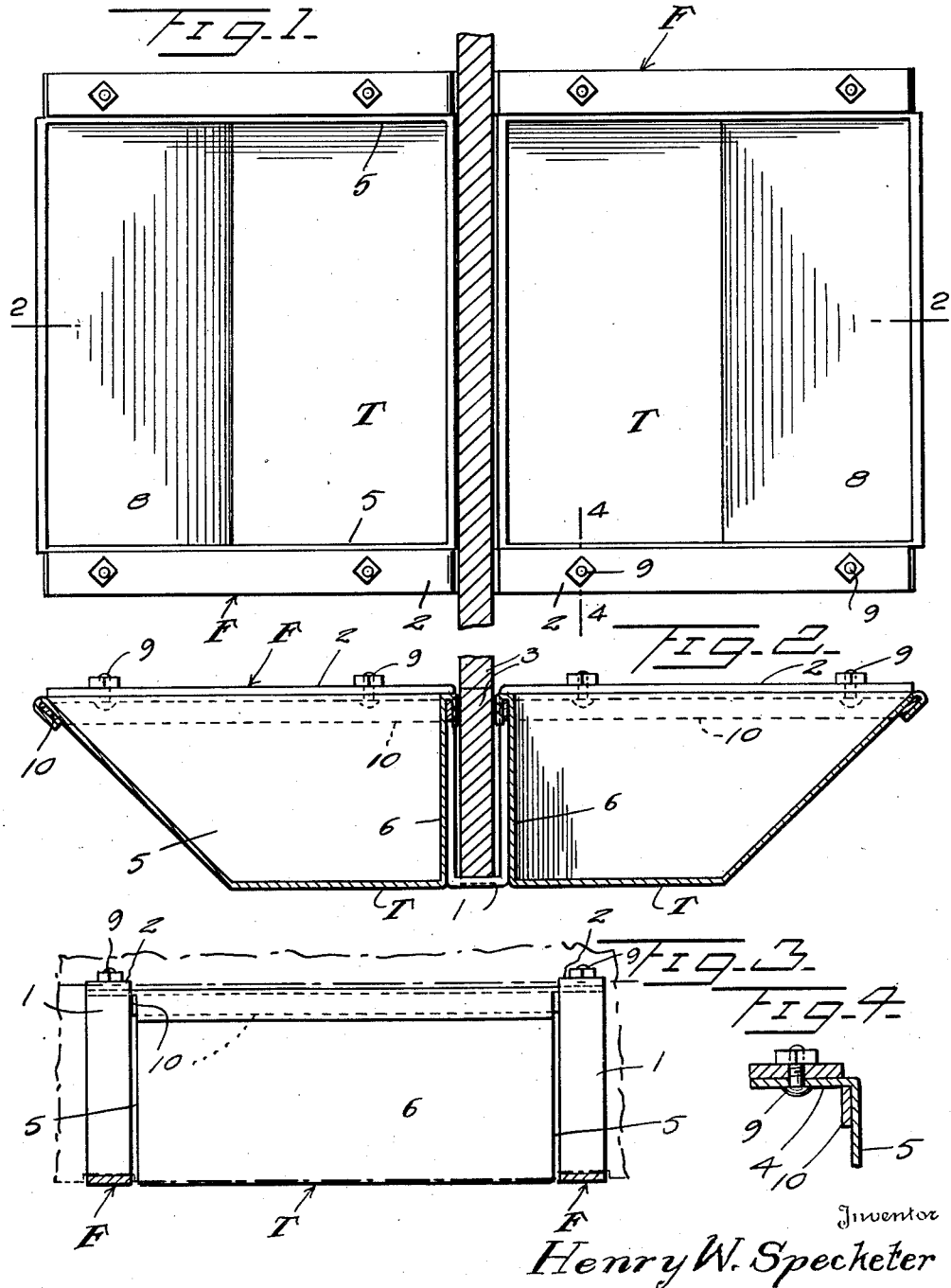

2,365,498

UNITED STATES PATENT OFFICE 2,365,498

TROUGH STRUCTURE

Henry W. Specketer, Alta, Iowa

Application April 2, 1943, Serial No. 481,617

4 Claims. (Cl. 119—61)

This invention relates to a watering or feed trough for hogs and has relation more particularly to a trough of this kind to be used at farrowing time and wherein the trough is of a type to be installed in the ordinary hog house without cutting any new holes of any kind.

The present method of feeding or watering sows when confined in the farrowing pen is slow and unsanitary and is usually accomplished by using large heavy troughs which are cumbersome and take up a great deal of room in the pen. It is an object of the present invention to provide a trough eliminating these disadvantages and wherein the trough constitutes a labor-saving, sanitary device.

Another object of the invention is to provide a trough of this kind comprising two feeding or watering compartments embodied in a single unit and which can be readily held in installed position by the usual removable partition between two farrowing pens by the weight of the partition itself and without the use of bolts, nails or other fastening elements.

A still further object of the invention is to provide a trough of this kind which can be easily cleaned and at the same time be of easy access to the hogs and wherein the construction of the trough is such as to permit the same to be readily removed for storage.

An additional object of the invention is to provide a device of this kind of a twin type so constructed that upon one of the troughs being unfit for use, such as the result of wear, rust or any other reason, the same can be readily replaced.

The invention consists in the details of construction and in the combination and arrangement of the several parts of my trough structure whereby certain important advantages are attained, as will be hereinafter more fully set forth.

In order that my invention may be better understood, I will now proceed to describe the same with reference to the accompanying drawing, wherein:

Figure 1 is a view in top plan of a trough constructed in accordance with an embodiment of my invention and in applied position, a coacting portion of a partition being shown in section.

Figure 2 is a vertical sectional view taken substantially on the line 2—2 of Figure 1.

Figure 3 is a transverse sectional view taken substantially at the longitudinal center of the device illustrated in Figure 1, and Figure 4 is an enlarged fragmentary detailed view taken substantially on the line 4—4 of Figure 1.

As disclosed in the accompanying drawing, F comprises two side frames preferably made of strap metal. These frames are of duplicate construction and comprise a centrally disposed and substantially U-shaped member 1 having its upper extremities continued by the oppositely disposed elongated members 2 substantially at right angles thereto. These members 1 and 2 are of such dimensions as the requirements of practice may prefer and the members 1 are of a size to substantially snugly receive one of the boards 3 comprised in the type of partition now generally used in farrowing houses to form separate compartments for each sow.

The frames F are spaced apart, of course, in accordance with the size of the device and the members 2 of the frame overlie the outstanding flanges 4 defining the upper margins of the side members 5 of the trough sections T. These trough sections are preferably of metal and have their back walls 6 and side walls 5 substantially straight while the front wall 8 is disposed upwardly and outwardly on a desired incline to make it possible to easily clean out a trough section with a broom or kindred implement and, of course, to facilitate the desired access of the stock to the content of the trough section.

The flanges 4, as herein disclosed, underlie the members 2 and extending through the flanges 4 and members 2 from below are the headed members or bolts 9 and threading upon said members or bolts 9 and coacting with the upper portions of the members are the holding or clamping members 10. This connection of a trough section T with the members 1 of the frame is such as to readily permit the section to be applied and with equal facility to be removed when it is desired to replace a trough section T for any reason as, for example, when the trough section becomes unfit for use as the result of wear or rust.

As is well known, the partitions now generally used in a hog or farrowing house are removable and, therefore, it is believed to be at once evident that the improved trough structure as herein disclosed is one which can be readily applied or removed when desired without requiring any undue labor on the part of the farmer and without cutting any new holes in the house structure.

While I have hereinbefore described my trough as of a twin type, it is believed to be obvious that it can be readily used as a single type by omitting the members 2 at one side of the frames F.

It is also to be pointed out that the improved trough structure as herein disclosed is maintained effectively in applied or working position by the weight of the partition resting on the intermediate or yoke portions connecting the sides of the U-shaped members 1 or more particularly in the members 1 thereof and that the trough structure is held in a manner whereby it cannot be turned over or tilted by the rooting of the hogs as it is held securely to the floor by the weight of the partition.

From the foregoing description it is thought to be obvious that a trough structure constructed in accordance with my invention is particularly well adapted for use by reason of the convenience and facility with which it may be assembled and operated.

What is claimed is:

1. A trough structure comprising two substantially duplicate frames each including an upright substantially U-shaped member to receive the lower edge of a partition of a hog house for holding the structure in position, said frames also including outstanding elongated members at the upper portions of the U-shaped members, and a trough detachably secured to said members.

2. A trough structure comprising two substantially duplicate side frames, said frames comprising a central upright substantially U-shaped member and oppositely disposed elongated straight members carried by the upper portions of the U-shaped members, a trough at each of the two opposite sides of the U-shaped members and underlying the straight members, and means for detachably connecting the trough sections to the straight members.

3. A trough structure comprising two frames each consisting of an upwardly opening substantially U-shaped portion and an arm extending from the upper end of a side thereof, said frames being disposed in spaced relation and adapted to receive in their U-shaped portions the lower edge of a partition wall of an animal house to be maintained in upright position by such wall, a trough disposed between said spaced arms, and means securing the trough to the arms.

4. A trough structure as set forth in claim 3 in which the trough has a portion of two side walls turned outwardly at the top to form a flange along and against which the adjacent arm engages and by which the attachment of the trough at each side to the adjacent arm is accomplished.

HENRY W. SPECKETER.